United States Patent [19]

Wickersham

[11] 4,351,505

[45] Sep. 28, 1982

[54] BATHROOM SCALE HOLDER

[76] Inventor: Edward Wickersham, 190 Nicholson Rd., West Collingswood Heights, N.J. 08059

[21] Appl. No.: 139,280

[22] Filed: Apr. 11, 1980

[51] Int. Cl.³ ............................ A47F 5/00; A47H 1/10
[52] U.S. Cl. ................................. 248/316 D; 211/89; 248/309 R
[58] Field of Search ........... 248/316 R, 316 D, 316 B, 248/309 R; 24/259 R, 260, 255 R, 252 R, 253; 211/89

[56] References Cited

U.S. PATENT DOCUMENTS

| 3,193,232 | 7/1965 | Hatcher | 248/316 R |
| 3,380,698 | 4/1968 | Goldberg | 248/316 D X |
| 4,033,531 | 7/1977 | Levine | 248/558 |
| 4,108,312 | 8/1978 | Craven | 211/89 X |

Primary Examiner—J. Franklin Foss
Attorney, Agent, or Firm—Thomas A. Lennox

[57] ABSTRACT

A bathroom scale holder is provided including a panel firmly attached to the wall with a pair of cantilever members extending from the panel onto which horizontally adjustable spring members are attached wherein the scale resting on the horizontal cantilever members is held in position by the spring members against the panel.

8 Claims, 7 Drawing Figures

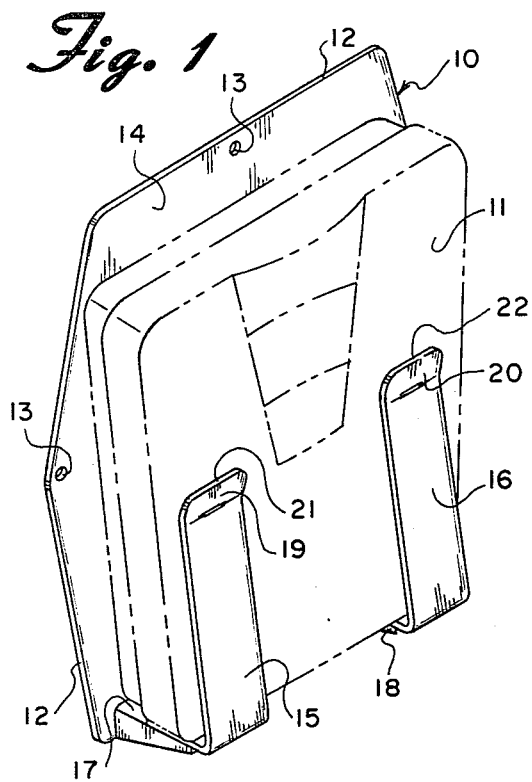
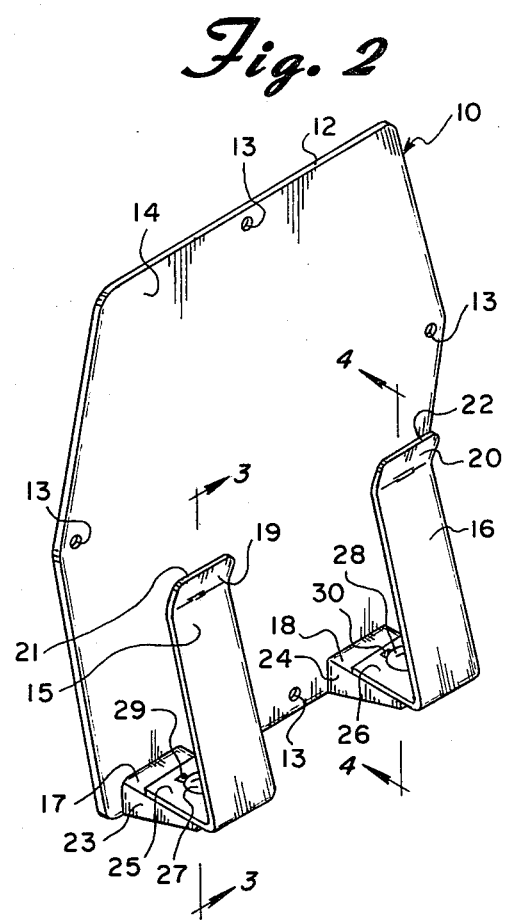
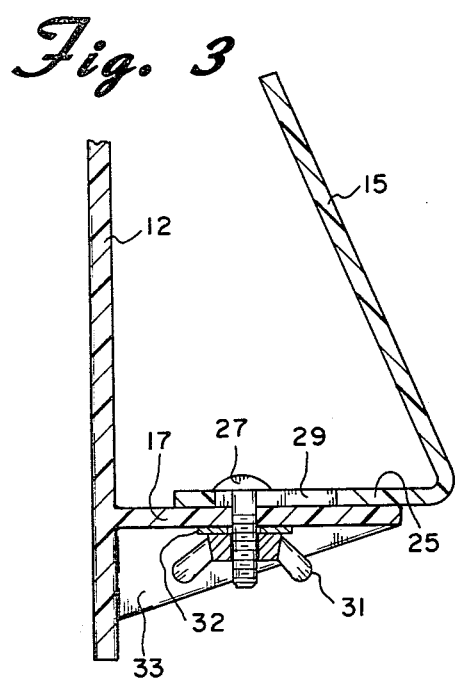
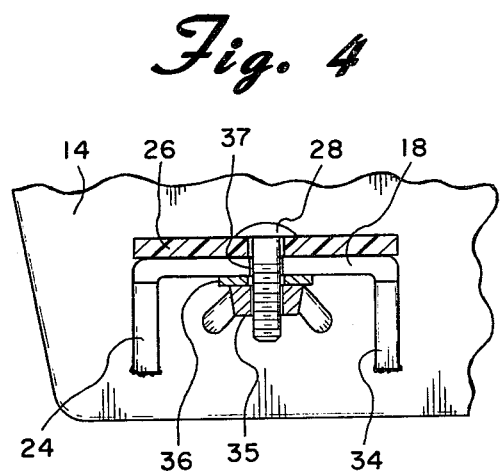

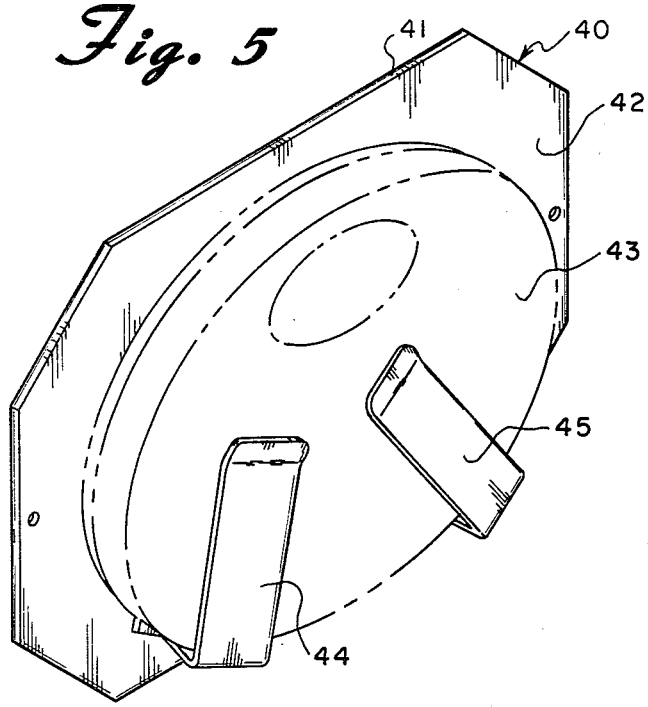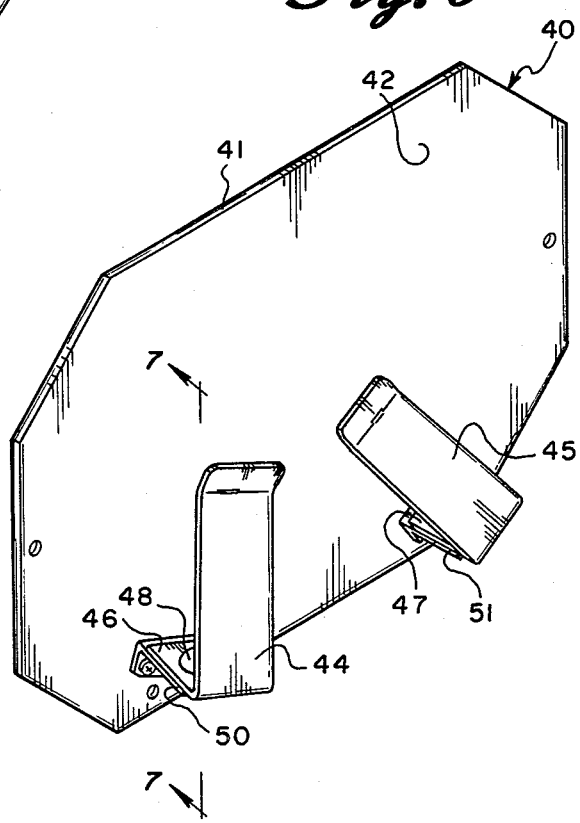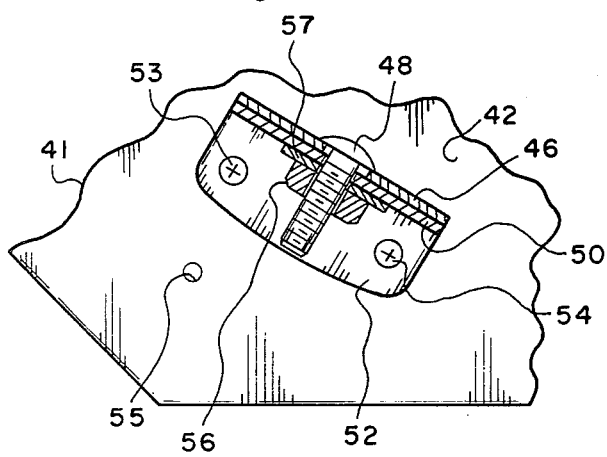

BATHROOM SCALE HOLDER

BACKGROUND OF THE INVENTION

This invention relates to wall holders generally in the field of shelves and the like. This invention relates in particular to a holder for bathroom scales which may be hung in the bathroom or in an adjoining room.

The common bathroom scale is found in practically every home and typically sits on the floor in the bathroom, in a closet or in a nearby room. When placed on the bathroom floor it is in the way to be kicked or stumbled over. A particular problem arises inasmuch as the bathroom is typically the dampest room in the house. Further, water, with or without soap or other additives is splashed on the scale from the sink or the toilet. As a result of the dampness, the water sits on the surface, seeps into the interior and can corrode the surface and the interior mechanisms of the scale in a short time. In addition, the water spotting and corrosion leaves the scale in an unsightly condition after a short period of use. It is inconvenient to place the scale in a closet as it is usually left there not to be used, it being more difficult to remove it after lifting and removing the things that have inadvertently been placed upon it.

There appears to be no product in the marketplace nor is there any awareness of a prior art device to solve this problem or satisfy the following objects.

It is an object of this invention to provide a holder for a bathroom scale which will place it in a convenient and yet out of the way position on a wall or the back of a door in an adjoining room.

It is an additional object of this invention to provide a bathroom scale holder which will hold the scale against a wall or door while protecting that surface and the surrounding area from marring or scratching.

It is an additional object of this invention to provide a bathroom scale holder which will hold the scale vertically but will also prevent the scale from being inadvertently bumped and caused to fall to the floor, damaging the scale and/or the floor.

It is a further object of this invention to provide a bathroom scale holder that allows the scale to be readily and easily removed from a convenient position to be used and then just as easily be placed back into the holder in a secure position.

It is an additional object of this invention to provide a bathroom scale holder which can hold a wide variety of shapes and sizes of bathroom scales and can be easily adjusted to fit and hold these bathroom scales.

It is an additional object of this invention to provide a bathroom scale holder that will not mar the bathroom and yet will be structurally sound and free from corrosion.

SUMMARY OF THE INVENTION

To satisfy the above needs and objects, a bathroom scale holder has been developed, including a panel basically in the form of a rigid sheet or plate of a shape and size approximately equal to and preferably slightly larger than typical bathroom scales. The size and shape may vary somewhat, depending upon the particular style of bathroom scale on the market, however, the size and shape should be chosen so as to protect the wall behind the panel on which it is attached. Attachment means are provided to hold the panel firmly against the wall. Two horizontal cantilever members extend from and are structurally attached to the lower portion of the panel. Two spring members are provided connected through an adjustable attachment system connecting each spring member to one of the horizontal cantilever members allowing the spring member to be adjusted as to its horizontal position from the panel and yet causing the connection to be firmly held in a chosen position. The spring members each extend in a generally vertical direction and in the direction toward the front surface of the panel, providing a springable force against a scale placed on the horizontal cantilever members to hold the scale against the front surface of the panel.

BRIEF DESCRIPTION OF THE DRAWINGS

FIG. 1 is a perspective view of a bathroom scale holder of this invention with a shadow view of a scale held in position.

FIG. 2 is a similar perspective view of the bathroom scale holder in FIG. 1 with the shadow view of the scale removed.

FIG. 3 is a partial cross-sectional view taken along lines 3—3 of FIG. 2.

FIG. 4 is a partial cross-sectional view taken along lines 4—4 of FIG. 2.

FIG. 5 is another bathroom scale holder of this invention showing an oval scale held in position.

FIG. 6 is a perspective view of the same bathroom scale holder illustrated in FIG. 5 with the scale removed.

FIG. 7 is a partial cross-sectional view taken along lines 7—7 of FIG. 6.

DESCRIPTION OF PREFERRED EMBODIMENTS

In FIG. 1, bathroom scale holder 10 is shown holding scale 11 in the position for storage. Holder 10 is entirely molded of a rigid polymeric plastic such as polymethyl methacrylate, polyacrylonitrile-styrene, polyvinyl chloride, or other like polymers and co-polymers and modified versions thereof. Panel 12 is easily connected to a chosen wall by wood screws or suitable attaching means through holes 13, some being hidden in this view, it being preferred that at least one of the attachments be into a stud or that heavier attachment systems be used than merely screws into plaster. The term "wall" as used throughout is intended to include interior walls and doors as the back of the bathroom door is a preferred location for hanging this device. Scale 11 is held against front surface 14 by springs 15 and 16. Scale 11 actually rests most all of its weight on horizontal cantilever members 17 and 18 which are molded as part of panel 12 and extended in a generally horizontal direction away from front surface 14 to allow scale 11 to be firmly held. Flanged ends 19 and 20 of spring members 15 and 16, respectively, bend away from the front surface 14 at an angle to allow scale 11 to be easily pushed against bottom edges 21 and 22 to spring members 15 and 16 away from surface 14 and allow scale 11 to be reinserted in holder 10.

In FIG. 2 horizontal cantilever members 17 and 18 are more clearly shown reinforced by gullet supports 23 and 24, the ones on the opposite edges of members 17 and 18 being hidden but of exactly the same shape and purpose. Horizontal connecting ends 25 and 26 are connected through carriage bolts 27 and and 28 through elongated holes 29 and 30 to horizontal cantilever members 17 and 18. The angle of the main body of spring members 15 and 16 is important so as to provide spring pressure against scale 11 to hold it against front surface 14. The angle of members 15 and 16 may be sufficient to cause edges 21 and 22 to almost touch front surface 14 but it is preferred that a small space be allowed to remain to more easily allow scale 11 to be pushed from above and easily reinserted into the holder. Adjustment of carriage bolts 27 and 28 to allow spring members 15 and 16 to be positioned at varying distances from front surface 14 through the use of elongated holes 29 and 30 allow scale holder 10 to be most versatile for most sizes and shapes of scales.

In FIG. 3 cross-sectional view of a portion of the scale holder shows that the lower section of the spring member 15 is angled to form horizontal connecting end 25 through which elongated hold 29 allows carriage bolt 27 to slide for adjustment. Spring member 15 is molded in a separate piece of the same material in which panel 13 is molded. Bolt 27 is held in a position by hand adjustable wing nut 31 which tightens against washer 32 which is larger in diameter than bolt 29. Opposite support member 33 is the compliment and is identical to support member 23 on the opposite edge of horizontal cantilever member 17 which is molded directly as one piece with panel 12.

In FIG. 4, a vertical cross-section, looking from the front shows the front edge of horizontal cantilever member 18 supported by support members 24 and 34 while directly molded with panel 12 shown here as front surface 14. Horizontal connecting end 26 is shown in cross-section held in position by bolt 28 with wing nut 25 tightened against washer 36 larger than hole 37 in horizontal cantilever member 18.

In FIG. 5, a perspective view of bathroom scale 40 including panel 41 with front surface 42 against which scale 40 is firmly held by spring members 44 and 45. Scale 43 is oblong in nature and it is preferred that for this type of scale that spring member 44 and 45 extend at angles toward each other to better hold scale 43 and prevent it from accidentally being knocked out of holder 40.

In FIG. 6, with scale 43 removed, the construction is more easily observed, that being a panel 41 being a tempered aluminum metal sheet about one-thirty second inch thick. Spring members 45 and 46 are each one-sixteenth inch thick tempered aluminum formed to include horizontal connecting ends 46 and 47 adjustably connected by carriage bolts 48 and 49 (hidden) to cantilever members 50 and 51 with a similar horizontal adjustment capability through elongated holes in members 46 and 47 to allow spring members 44 and 45 to be adjusted as to their distance from front surface 42 to allow various thicknesses of scales to be easily held and inserted. As illustrated in the cross-sectional view of FIG. 7, L-shaped cantilever member 50 with vertical attachment end 52 is equipped with holes through which metal screws 53 and 54 securely fasten cantilever member 50 to the front surface of 42 of panel 41. An extra hole, 55, is provided to allow cantilever member 50 to either be horizontal or angled toward the center of panel 41 to allow spring members 44 and 45 to be angled toward each other and more easily hold a round or oval scale 43. When a square or rectangular scale is used, metal screw 53 is connected to hole 55 thereby exposing another hole, (hidden) which can be used to further fasten plate 41 to the wall. Thus, whichever configuration is used for spring members 44 and 45, an extra hole will be available for connection of panel 41 to the wall. Horizontal end 46 of spring member 44 is firmly and adjustably held against the horizontal portion of cantilever member 50 by bolt 48 which is secured by nut 56 tightened against washer 57 to hold the entire device as an integral unit. L-shaped cantilever member 50 is formed of three-sixteenth inch tempered aluminum metal sheet.

While I have described my invention in connection with specific embodiments, it is to be clearly understood that this description is made only by way of example and not of limitation to the scope of my invention as set forth in the following claims.

I claim:

1. A bathroom scale holder comprising
   (a) a panel member comprising a rigid sheet of a size approximately that of the typical bathroom scale,
   (b) attachment means to hold the panel firmly against a wall,
   (c) two horizontal cantilever members extending from and structurally attached to a lower portion of the panel,
   (d) two spring members,
   (e) adjustable attachment means connecting one of the spring members to one of the horizontal cantilever members allowing the spring members to be adjusted as to its horizontal position for the panel and causing the connection to be firmly held in a chosen position,
   wherein the spring members extend in a generally vertical direction and toward the front surface of the panel to hold a scale placed on the horizontal cantilever members against the panel surface, and
   wherein at least one of the two pairs of cantilever-spring members through adjustable fastening means, adjusts the angle of the spring members from a generally vertical alignment to an alignment wherein the spring members are angled toward each other along a plane generally parallel with the panel member.

2. The bathroom scale holder of claim 1 wherein the attachment means is a plurality of holes through which screws are fixed to the wall and the fastening means use at least two of the same holes leaving holes unused for use in the attachment means whichever position is chosen for the fastening means.

3. A bathroom scale holder comprising
   (a) a panel member comprising a rigid sheet of a size approximately that of the typical bathroom scale,
   (b) attachment means to hold the panel firmly against a wall,
   (c) two horizontal cantilever members wherein each member extends from and is structurally attached to the panel by two fastening means spaced horizontally apart from each other along the lower portion of the panel,
   (d) two spring members, and
   (e) adjustable attachment means connecting one of the spring members to one of the horizontal cantilever members allowing the spring members to be adjusted as to its horizontal position from the panel and causing the connection to be firmly held in a chosen position,
   wherein the spring members extend in a generally vertical direction and toward the front surface of the panel to hold a scale placed on the horizontal cantilever members against the panel surface, and
   wherein at least one of the fastening means for each cantilever member is capable of adjustment vertically to adjust the angle of the spring members from a vertical alignment to an alignment wherein they are angled toward each other along a plane generally parallel with the rigid sheet.

4. The bathroom scale holder of claim 3 wherein the cantilever members are "L" shaped sheets wherein one end is fastened to the rigid sheet holding the free end in a generally horizontal position.

5. The bathroom scale holder of claim 4 wherein the fastening means are metal fasteners extending through holes in the "L" shaped member and through holes in the panel member.

6. The bathroom scale holder of claim 5 wherein there are two holes vertically spaced in the panel for at least one of the fastening means on each "L" shaped member and in at least one position the cantilever member covers the unused hole.

7. The bathroom scale holder of claim 6 wherein the unused hole is located close to the periphery of the panel and is in a position to be used as part of the attachments to the wall.

8. The bathroom scale holder of claim 3 wherein the attachment means is a plurality of holes through which screws are fixed to the wall and the fastening means use at least two of the same holes leaving holes unused for use in the attachments means whichever position is chosen for the fastening means.

* * * * *